Sept. 6, 1955 J. R. ANDERSON 2,717,372

FERROELECTRIC STORAGE DEVICE AND CIRCUIT

Filed Nov. 1, 1951 6 Sheets-Sheet 1

INVENTOR
J. R. ANDERSON

BY D. MacKenzie

AGENT

INVENTOR
J. R. ANDERSON

BY D. MacKenzie
AGENT

INVENTOR
J. R. ANDERSON
BY
[signature]
AGENT

INVENTOR
J. R. ANDERSON
BY
D. MacKenzie
AGENT

INVENTOR
J. R. ANDERSON
BY [signature]
AGENT

FERROELECTRIC STORAGE DEVICE AND CIRCUIT

INVENTOR
J. R. ANDERSON
BY
D. MacKenzie
AGENT

United States Patent Office 2,717,372

Patented Sept. 6, 1955

2,717,372

FERROELECTRIC STORAGE DEVICE AND CIRCUIT

John R. Anderson, Berkeley Heights, N. J., assignor to Bell Telephone Laboratories, Incorporated, New York, N. Y., a corporation of New York Application November 1, 1951, Serial No. 254,245

13 Claims. (Cl. 340—173)

This invention relates to electrical data storage circuits, particularly those in which the storage element comprises a ferroelectric crystal.

A "ferroelectric substance" is defined to be one which when exposed to an alternating polarizing voltage exhibits a relationship between electrostatic polarizing force and polarization in the direction thereof similar to the hysteresis loops exhibited by ferromagnetic materials.

This "electrostatic hysteresis," as it is conveniently termed, is characteristic of a number of piezoelectric substances, examples being:

Barium titanate;
Rochelle salt;
Potassium dihydrogen phosphate;
Potassium niobate;
Sodium niobate.

Crystals of any of the above-listed compounds vary among themselves with respect to the temperature range within which they exhibit ferroelectric properties, and in coercivity, dielectric constant and saturation polarization. Of these materials, barium titanate is particularly suitable as a ferroelectric memory element and the invention will be described with reference to this substance by way of illustration though not of limitation.

Among the advantages of the ferroelectric, as compared with the ferromagnetic, memory elements, are: (*a*) no eddy current losses; (*b*) no magnetic domains to reverse, with significant powers required; (*c*) a frequency range extending to megacycles where the ferromagnetic elements commonly operate at frequencies no higher than 50 kilocycles. There are, of course, electrostatic domains in barium titanate, but their reversal has been accomplished with voltage pulses as short as one-half microsecond.

A general object of the invention is thus to provide an improved storage circuit.

Specifically, an object of the invention is to provide a storage circuit including electrostatic memory elements.

Yet more specifically, an object of the invention is to provide a storage circuit employing barium titanate in crystal or ceramic form as memory elements.

The ferroelectric elements utilized in the present invention are economical in power consumption and are small in size and mass, enabling the production of memory circuits more inexpensive and compact than it is feasible to produce with memory elements heretofore in use, and this is another object of the invention.

Further, an object of the invention is to provide a storage circuit capable of operation at frequencies of the order of megacycles.

The storage elements of the present invention may be used in storage and counting circuits of various types and may be combined in a novel delay line, requiring only a single initial storage pulse to activate the line from which a corresponding output pulse may be obtained at any one of an indefinite number of finite delay intervals subsequent to the storage of the initial pulse. To provide such a delay line is another object of the invention.

The characteristics of compactness, wide frequency range of operation, simplicity and low power consumption make the ferroelectrics especially useful in storage circuits generally and particularly in digital computers and switching systems. A further object of the invention is, therefore, to provide improved circuits for the storage of information in binary form for computation and for control of selectively responsive apparatus.

The invention will be clearly understood from the following description of certain embodiments thereof, read with reference to the accompanying drawings, in which.

Figure 2A:
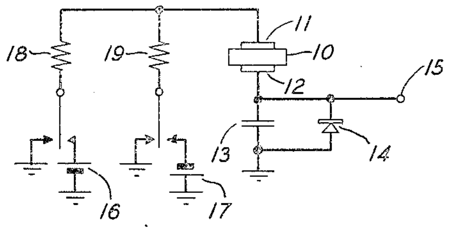
Fig. 2A is a diagram of a basic memory circuit using a ferroelectric crystal.
Figure 3:
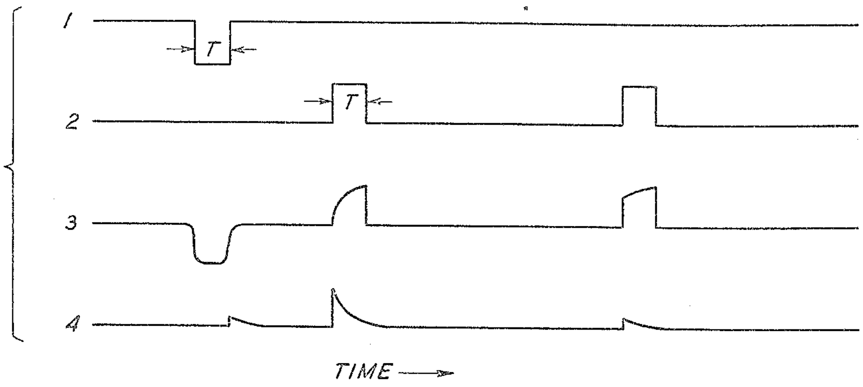
Figure 4:
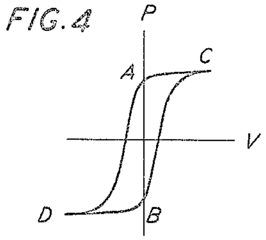
Figure 5A:
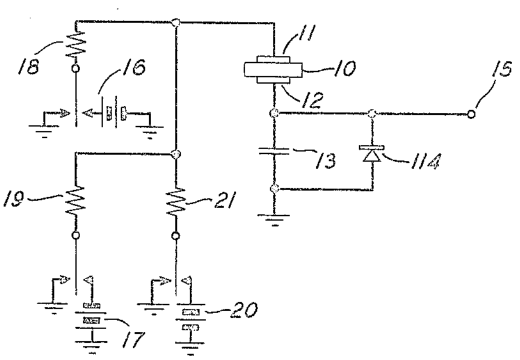
Figure 5B:
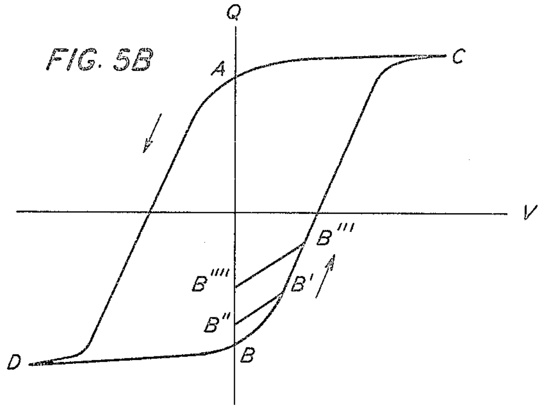
Figure 6:
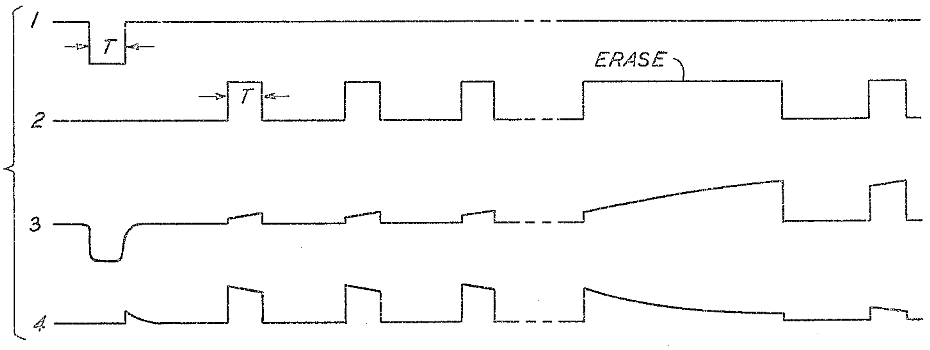
Figure 7A:
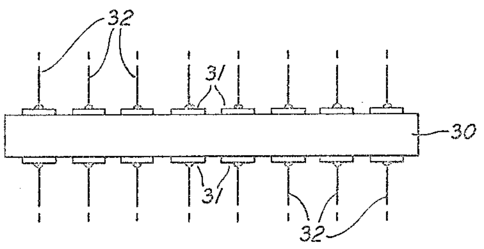
Figure 7B:
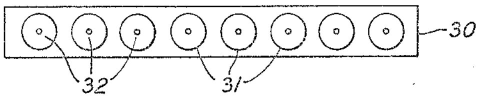
Figure 8:
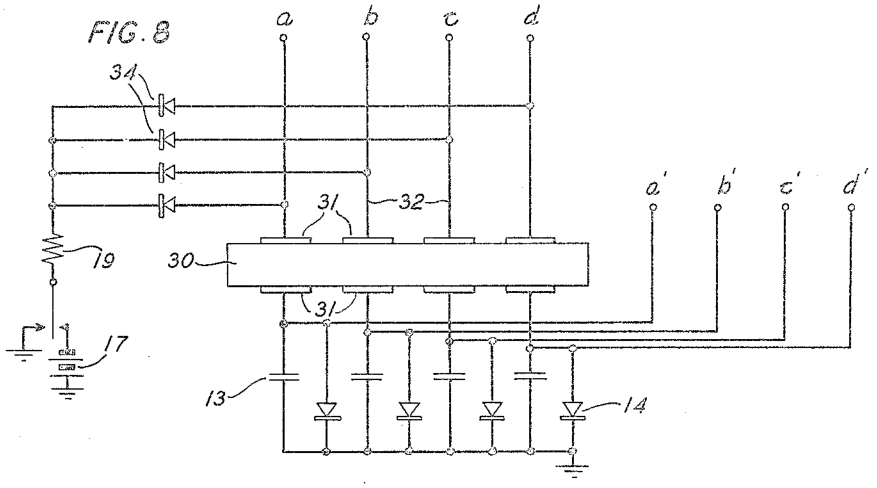
Figure 10:
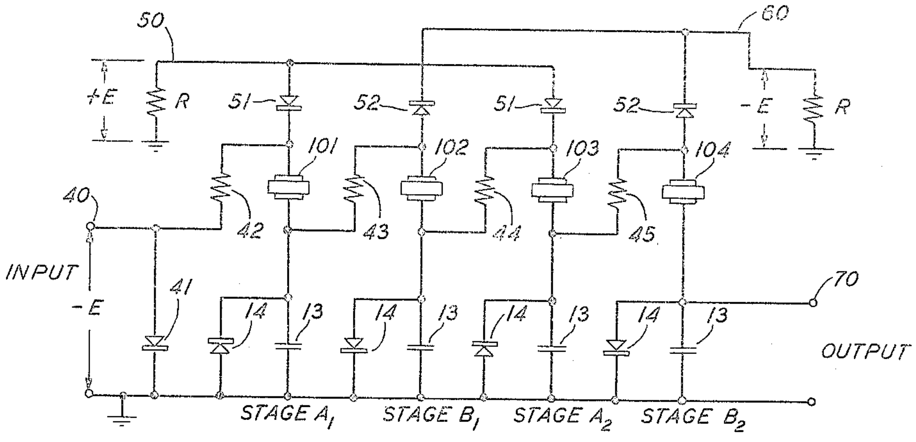
Figure 11:
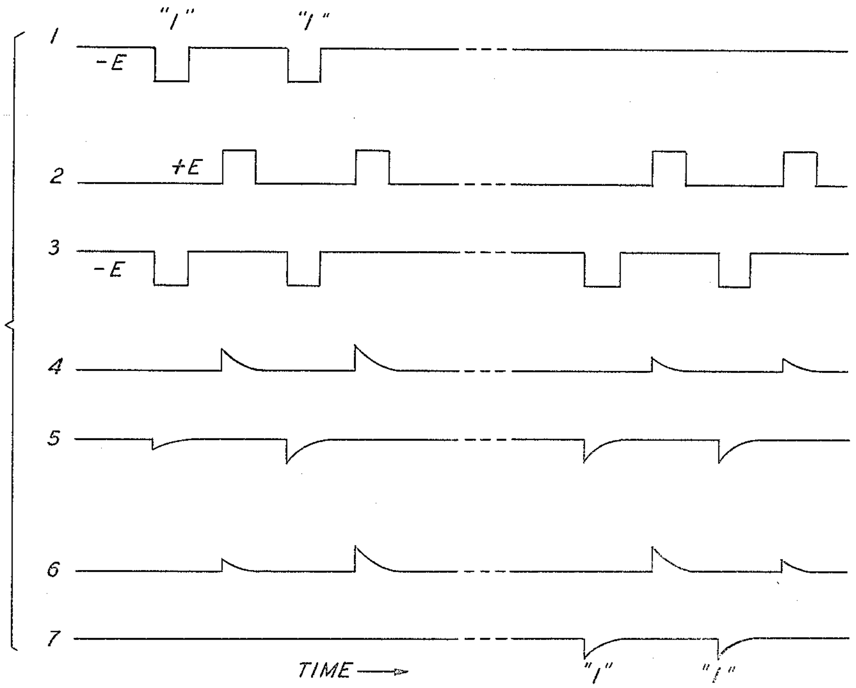
Figure 12:
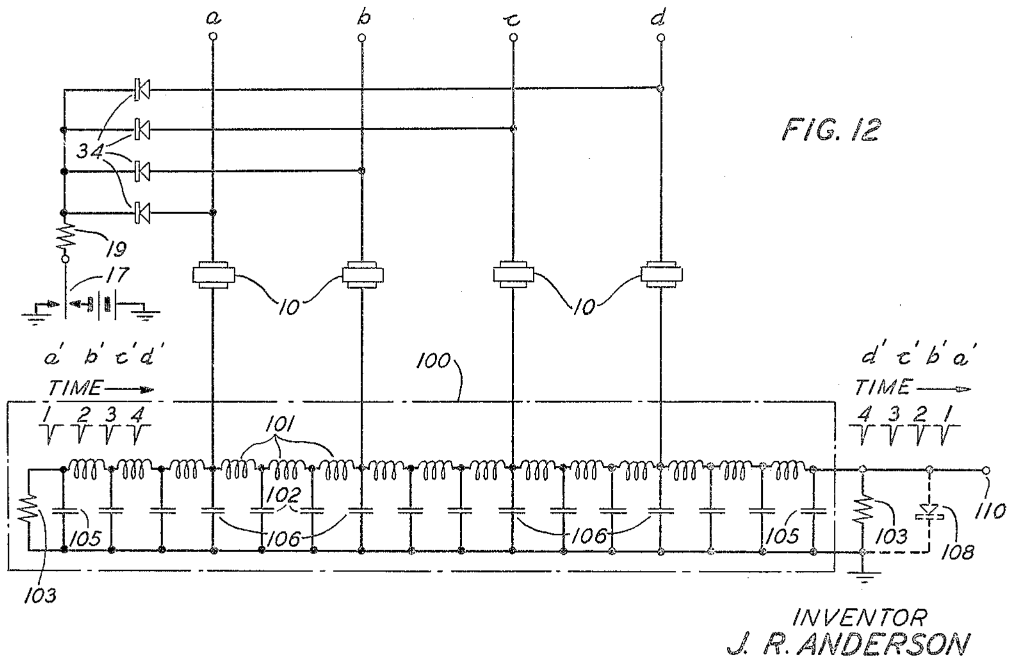
Figure 13:
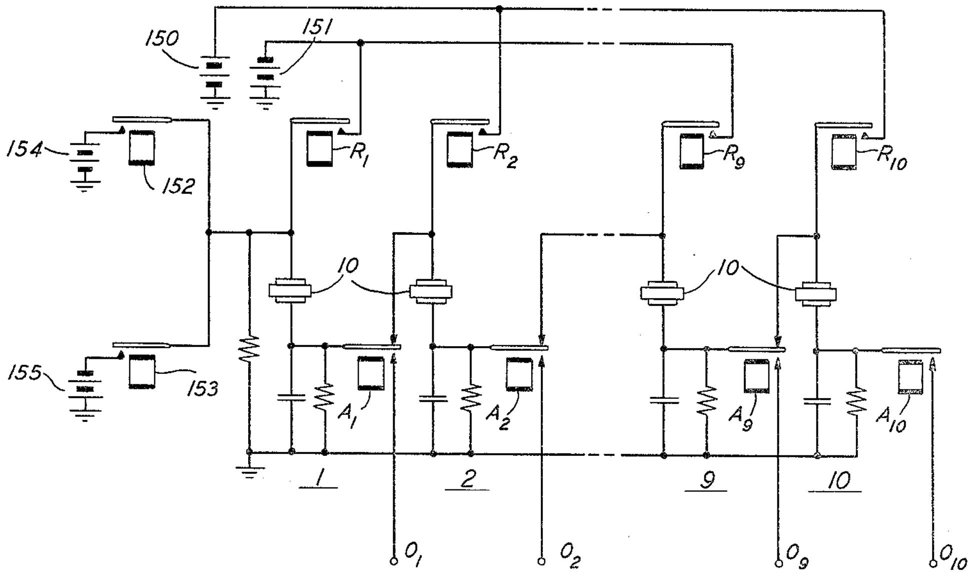
Figure 14:
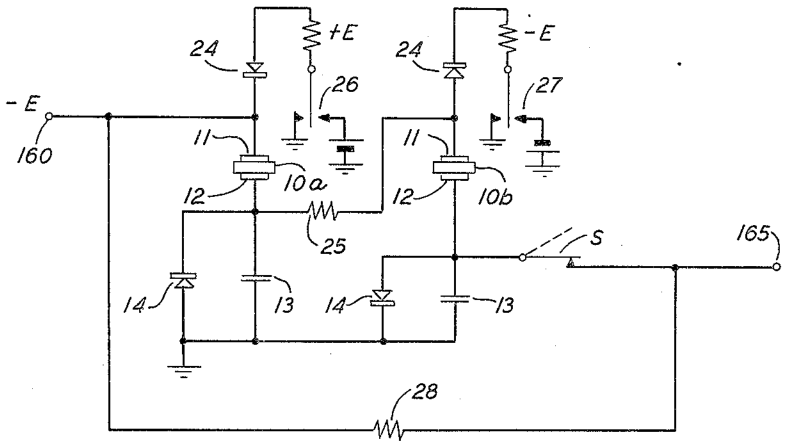

Fig. 3 exhibits graphically the events in the operation of the circuit of Fig. 2A;

Fig. 4 depicts the actual hysteresis loop of a barium titanate crystal in the circuit of Fig. 2A;

Fig. 5A illustrates a modification of the circuit of Fig. 2A;

Fig. 5B is a diagram of the hysteresis loop traversed in the operation of the circuit of Fig. 5A;

Fig. 6 shows graphically the events in the operation of the circuit of Fig. 5A;

Figs. 7A and 7B are diagrams illustrating an embodiment of this invention wherein a plurality of memory cells are formed on a single ferroelectric crystal;

Fig. 8 shows a circuit including a plurality of memory cells formed as in Figs. 7A and 7B;

Figs. 9A through 9E exhibit diagrammatically various constructions in accordance with this invention of individual memory cells and corresponding circuits;

Fig. 10 is a diagram of a circuit for serial storage and serial read out of digit-representative pulses;

Fig. 11 exhibits the sequence of pulses produced in the operation of the circuit of Fig. 10;

Fig. 12 is a diagram of a ferroelectric memory circuit including a delay line;

Fig. 13 is a diagram of a counting and registering circuit using ferroelectric memory cells; and Fig. 14 is a diagram of a permanent memory circuit in which a single digit is stored alternately in one and then in another ferroelectric memory cell.

In all figures, like numerals or letters designate like elements or conditions.

Figure 1:
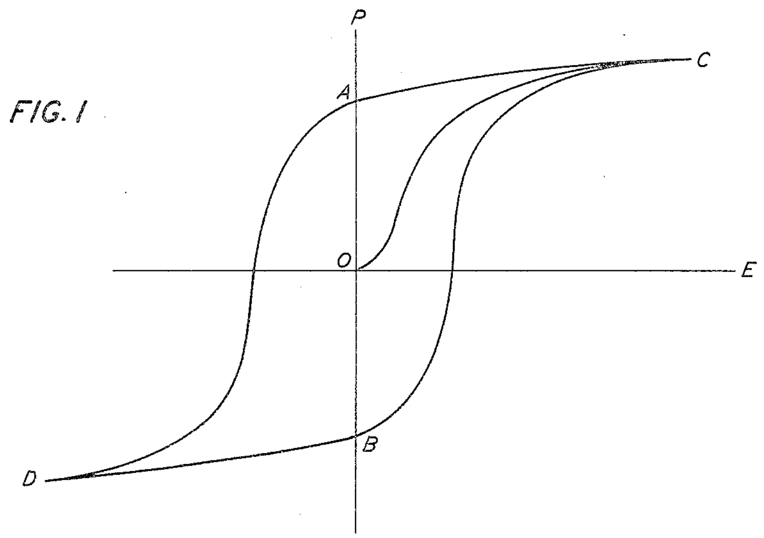
Fig. 1 is a typical hysteresis loop of a crystal of barium titanate.

Referring to Fig. 1, the electric field strength applied through the thickness of a ferroelectric crystal is plotted on the E axis, positive to the right of O, while the consequent polarization of the crystal is plotted on the P axis, positive upward.

Starting from zero field and polarization at point O, the curve rises to the right at first gradually, then rapidly and finally slopes asymptotically to saturation at C. Slow or rapid removal of the positive field now allows the polarization to fall to a positive value at A, the remanent polarization. To abolish this, a negative field must be applied; this field, the coercivity, is for barium titanate about 250 to 7000 volts per centimeter, depending on the pretreatment of the crystal. In analogy to the hysteresis loop of ferromagnetic materials, the remainder of the complete loop CADBC is obtained.

The saturation polarization is of the order of 16 microcoulombs per square centimeter, in the case of barium titanate. In this substance, the reversible permittivity (the rate of change of polarization with field strength for a cube of unit side), or the slope of the curve in the immediate neighborhood of point C or point D, is about 1200. The saturation field strength is about four to eight times the coercivity.

Such loops as in Fig. 1 are conveniently displayed on a cathode ray oscilloscope screen, a suitable circuit for the purpose being that described by C. B. Sawyer and C. H. Tower, "Rochelle Salt as a Dielectric," Physical Review, volume 35, page 269, 1930. A loop for barium titanate, obtained in this way at 60 cycles, is described in connection with Fig. 4.

It has been found that barium titanate is better adapted for memory circuits in crystals than in ceramic sheets such as have long been used for condensers. Crystals no larger than about one-quarter inch in diameter each serve to form a considerable number of memory "cells."

Referring now to Fig. 2A, diagrammatically the basic circuit for the storage of the binary digits "1" and "0" comprises barium titanate crystal 10, to the opposite sides of which are affixed silver spots to serve as condenser plates 11 and 12. The crystal thickness may be 0.010 inch and plates 11 and 12 may be 0.020 inch in diameter.

Plate 12 is connected in series with condenser 13 to ground, and across condenser 13 a diode 14, suitably of germanium or copper oxide, is connected. A voltage appearing across condenser 13 is supplied at terminal 15 to a desired utilization circuit, not shown.

Positive or negative voltage pulses may be applied to crystal 10 from battery 16 or battery 17, respectively, representing pulse generators in series with resistors 18, 19.

Assume that a positive pulse has initially been applied to drive the crystal to its saturation positive polarization, after which it returns to condition A, Fig. 1. No external charge remains on the plates 11—12, but the remanent polarization of condition A persists within the crystal, while voltage across the crystal has returned to zero. Assume further that a negative pulse corresponds to the binary digit "1," and no pulse corresponds to the digit "0."

Let such a negative pulse now be applied to crystal 10, equal in magnitude to the positive pulse which initially polarized the crystal. The voltage across crystal 10, which was zero after the cessation of the initial polarizing pulse, is negative during the application of the storage pulse and again returns to zero thereafter. The small voltage positive to ground across condenser 13 during the initial positive pulse was dissipated in diode 14 on the cessation of that pulse. During the storage pulse, a voltage negative to ground is dissipated through diode 14 poled as indicated; diode 14 is substantially a short circuit for a negative pulse, whereas it furnished a slow leak for the positive pulse initially polarizing the ferroelectric crystal.

Digit "1," now stored as remanent negative polarization (condition B) in crystal 10, may remain stored for days without loss. To read it out as a voltage pulse at 15, the positive pulse generator represented by battery 16 is operated to reverse the polarization of crystal 10 from condition B to C, and then to A on cessation of the read-out pulse. During this pulse, a positive voltage pulse across condenser 13 appears at terminal 15 and only slowly disappears because diode 14 is of high impedance for this polarity.

The series connection of crystal 10 and fixed condenser 13 may be regarded as a voltage divider for the applied pulse whether positive or negative. The fraction of either pulse appearing at terminal 15 is determined by the relative capacities of condenser 13 and crystal 10 when the pulse is positive (read out) and by the relative impedances of diode 14 and crystal 10 when the negative storage pulse is applied; in the latter case, the output pulse at 15 is small in comparison to that provoked by the read-out pulse. Numerically equal voltage pulses are suitable for the initial conditioning, for the storage of digit "1," and for the reading out of the digit. As already mentioned, pulse durations of one microsecond or less suffice.

The convention usually adopted, that a negative voltage pulse stores digit "1" and no pulse corresponds to digit "0," means that a negative pulse reverses the remanent polarization of crystal 10 from A to B while digit "0" corresponding to no pulse leaves the polarization at A. With this convention in mind, it is easy to show that a positive read-out pulse applied to the ferroelectric crystal or condenser in condition A provokes at terminal 15 only a small pulse positive to ground. This may be seen on reference to Fig. 2B.

Figure 2B:
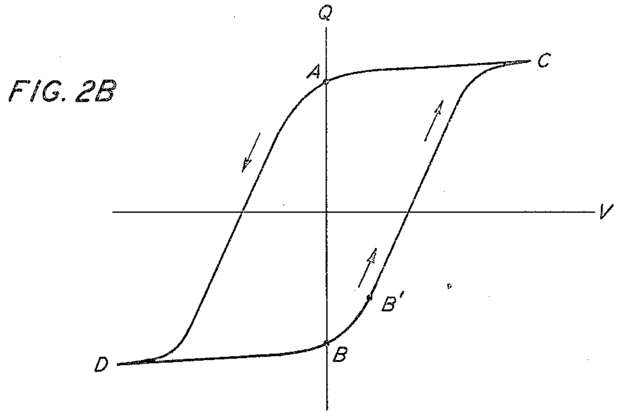
Fig. 2B is a dynamic loop characteristic of such a crystal in the circuit of Fig. 2A.

Fig. 2B shows the dynamic ferroelectric hysteresis loop involved in the operation of the circuit of Fig. 2A. Here the ordinates are Q, the internal charge of crystal 10, equal to the internal polarization P per unit area of plate 11 or 12, and the abscissae are V, the applied voltage, equal to the applied electric field strength E times the crystal thickness T. For any segment of the loop, the capacitance of crystal 10 is the ratio of change in polarization per unit volume to change in applied field. If $$Q=\frac{P}{A} \text{ and } V=ET,\ \frac{dQ}{dV}=\frac{1}{AT}\,\frac{dP}{dE}$$

it is obvious from the figure that this ratio is large along the steep parts of the segments B to C and A to D; small over the segments C to A and D to B. Condenser 13 being of fixed capacitance, the voltage across it is a large fraction of the applied pulse during read out. Except for the presence of diode 14, the same would be true during storage of digit "1."

Digit "0" is stored by no pulse, so the crystal is in condition A. A positive read-out pulse now can change the polarization from A to C over a path where the capacitance of crystal 10 is small. The output pulse at terminal 15 is now small compared to that provoked by a similar read-out pulse applied under condition B, but both pulses are of the same polarity.

Fig. 3 diagrammatically exhibits the relations above set forth. Time increases as indicated by the arrow and events are represented on the numbered lines as follows: on line 1, storage of digits "1" and "0" by a negative pulse and by no pulse, respectively; on line 2, a succession of positive read-out pulses; on line 3, the voltage across the ferroelectric crystal; on line 4, the output pulses at terminal 15 of Fig. 2A.

It is obvious that by reversing all polarities and the connection of diode 14, it is possible to store digit "1" at B instead of at A, Fig. 2B. Moreover, diode 14 may be replaced by a resistance equal to the back resistance of diode 14; the disadvantage thereby incurred is the appearance of the storage pulse at terminal 15, which is in some circumstances tolerable.

The pulse length, T, of lines 1 and 2, Fig. 3, is a microsecond, for example. The capacitance C of condenser 13 must of course be intermediate the high and the low capacitance (C'' and C') of crystal 10. Further, the time constants are suitably given by the following relations among the resistance $R_0$ of resistors 18 and 19, the back resistance $R_B$ of diode 14, the capacitances of the circuit and the pulse length:

$$R_B(C''+C)=\tfrac{1}{3}T \qquad R_0C''\ll T \qquad (1)$$

Capacitances C' and C'' are approximately determined by measurements of the slopes of the nearly straight portions of the segments C—A and B—C on the oscilloscope trace. An example of this is seen in Fig. 4. To obtain the loop there shown, a barium titanate crystal 0.010 inch thick was provided with plates of silver spots 0.020 inch in diameter and across the crystal a 60-cycle voltage of 180 volts peak was applied. The scales of abscissas and of ordinates being known, it was possible to estimate C' as 37 micromicrofarads, C'' as 600 micromicrofarads.

More accurate values of these capacitances are got by measuring the voltages of the read-out pulse and of the output pulses for "1" stored and for "0" stored: lines 2 and 4, Fig. 3. It is easily shown that the peak voltage $E_1$ of the read-out pulse is related to the peak voltages $E_2$ and $E_3$ of the output pulses for stored "1" and stored "0," respectively, as follows:

$$\frac{E_2}{E_1}=\frac{C''}{C''+C};\ \frac{E_3}{E_1}=\frac{C'}{C'+C} \qquad (2)$$

Measurements on the circuit from which the loop of Fig. 4 was obtained, C being chosen as 312 micromicrofarads, gave 400 micromicrofarads for C″, 34 micromicrofarads for C′; the effective values of C′ and C″ are lower than those estimated for the oscilloscope trace, since the latter values neglect the curvatures at the ends of the segments observed.

From Equation 1, it appears that $R_B$ should be about 500 ohms, $R_0$ about 250 ohms, for this specific circuit with T one microsecond. Also, it is noted that the ratio of output pulse voltages for digits "1" and "0" is $$r=\frac{E_2}{E_3}=5.7$$

while $$\frac{E_2}{E_1}=0.56$$

and C″=11.8, C′=xC′.

Once the values of C′, C″ and their ratio $$x=\frac{C''}{C'}$$

have been determined, using any convenient value of C in measuring $E_1$, $E_2$ and $E_3$, Equations 2 enable one to compute the value of C to use for a desired value of $r$. It can be shown that $$C=C''\left(\frac{r-1}{x-r}\right) \qquad (3)$$

A practical value for $r$ is 5, the ratio of output voltage peaks for stored "1" and stored "0." Equation 3 then shows that for the crystal represented in Fig. 4 ($x$=11.8), C is suitably $$\frac{C''}{1.7}$$

or 235 micromicrofarads for $r$=5, giving $$\frac{E_2}{E_1}=0.63 \text{ and } \frac{E_3}{E_1}=0.126$$

C″ and $x$ are properties of the particular crystal, while $r$ is a matter of choice based on the discrimination of the utilization circuit supplied from terminal 15, Fig. 2A.

It can readily be shown that the average power required for storing digits "1" is $P_S=\frac{1}{2}C''E_1^2n$, where $n$ is the number of times per second that the digit is stored, assuming that each stored digit is read out before the next storage. Likewise, the average read-out power $$P_R=\frac{5}{8}C''E_1^2n.$$

In each case $E_1$ is the amplitude of the voltage pulse, storage and read out. The expression for $P_R$ relates to the condition, $C=C''$, which requires the maximum read-out power.

Clearly, to operate at high frequencies it is desirable to reduce as far as possible the power required, and this means reducing C″. A practical value for C″ is 100 micromicrofarads, and if $$\frac{E_2}{E_1}=0.5$$

is a satisfactory output/input voltage ratio, C can be made also 100 micromicrofarads. In this case Equation 3 leads to the value $x$=8, that is, C′=12.5 micromicrofarads. These are practically acceptable values for operation at frequencies as high as a megacycle or above. The power expressions given in the preceding paragraph indicate that in the circuit of Fig. 2A, with $C''=C$=100 micromicrofarads, the total power $P_S+P_R$ at $n$=1,000,000 is about 1 watt for a storage pulse voltage $E_1$ of 100 volts; 0.01 watt for $E_1$=10 volts. For the same memory circuit at 100 cycles, 100 microwatts for $E_1$=100; 1 microwatt for $E_1$=10.

The circuit of Fig. 2A is obviously adapted to the storing and reproducing of "on-off" information for the same purpose as the ferromagnetic cores of the article by An Wang in the Proceedings of the Institute of Radio Engineers, volume 39, page 401, April 1951, "Magnetic delay-line storage," or the magnetic means disclosed in Fig. 3 of United States Patent 2,430,457, granted November 11, 1947, to T. L. Dimond. The latter is used in a key control sender circuit for recording digits of a number called from a dial telephone and later translating the stored information into electrical impulses.

In the memory circuit just described, a single read-out pulse destroys the memory stored in the ferroelectric by the preceding negative storage pulse. This is because the back resistance of diode 14 is low enough to allow crystal 10 to charge up during read out to the condition C, after which the crystal returns to condition A, its original state. To obviate this and to provide for repeated read out with an eventually applied erasing pulse, the basic circuit of Fig. 2A is modified, as in Fig. 5A.

In Fig. 5A there is added a source of positive erase pulses, symbolized by battery 20 acting through resistance 21, which is understood to be controlled to apply at a chosen instant a relatively long pulse to restore crystal 10 to its original (positively polarized) condition. Diode 114 is like in character to diode 14 of Fig. 2A but has five to ten times the back resistance of the latter.

Fig. 5B is representative of the changes in condition of crystal 10 in the modified circuit. Starting with crystal 10 in condition A, a negative pulse stores digit "1" in the same way as before, leaving the crystal in condition B. The diode here is a (comparatively) low resistance shunt on condenser 13 for the negative storage pulse.

However, when a positive read-out pulse of the same voltage and duration as before is applied to the crystal and condenser in series the high back resistance of diode 114 prevents the complete recharging of crystal 10. The crystal condition moves only from B to B′, say, and returns to B″ at the end of the read-out pulse. It will be recognized that the region B—B′ —B″ is a fractional part of a minor hysteresis loop between negative polarizations B and B″.

Similarly to Fig. 3, lines 1 to 4 in Fig. 6 exhibit the voltages successively appearing in the circuit of Fig. 5A. By reason of the high back resistance of diode 114, the voltage pulses across the ferroelectric element and at terminal 15 are respectively smaller and larger than the corresponding pulses in Fig. 3. But the erase pulse of line 2 and the accompanying ferroelectric voltages and output pulses (lines 3, 4) are, for digit "1" stored, similar to although of larger duration than their counterparts in lines 2, 3 and 4 of Fig. 3.

Since crystal 10 in Fig. 5A changes from condition B over only a small range of the full shift from B through C to A, the polarization remains at B″ after the first read out and the first output pulse. The crystal is now prepared for another read-out pulse and accompanying output pulse, moving in the course thereof from B″ to B‴ and to B⁗. It is to be understood that the ranges B to B″ and B″ to B⁗ are greatly exaggerated for the sake of clarity of illustration.

It is further to be noted that the slope of B′B″, while less than that of the steepest part of the path BC, is yet much greater than for CA. Repeated read outs find continuously decreasing slopes, as B‴ to B⁗, so that the effective value of the capacitance C″ decreases as the point B″, or B⁗ rises on the polarization axis until eventually there is little difference between output pulses for stored "1" and for stored "0." This was found to appear, in a particular case, after 5,000 read outs.

In Fig. 7A, numeral 30 indicates a ferroelectric crystal of barium titanate, for example, actually about 0.200 inch long, 0.025 inch wide and 0.010 inch thick but enlarged for the sake of clearness of illustration. Silver spots 31, each about 0.020 inch in diameter and separated by a spacing which may be as small as 0.005 inch, are fired on to crystal 30 to form condenser plates to which leads 32 are soldered. In the figure, eight such memory cells are indicated, and it has been found that the 5 mil spacing between neighboring plates on each face of the crystal is sufficient to avoid cross talk between the cells, despite their common dielectric.

Fig. 7B shows the plan view of the cells shown in side elevation in Fig. 7A.

Fig. 8 shows an arrangement of apparatus using four ferroelectric memory cells on a single crystal as in Fig. 7, adapted for storing, for example, the binary number 1011 (in denary rotation, 11). Here it is assumed convenient to set the normal polarization at point B, Fig. 1, negative remanent polarization, and read-out negative pulses then provide negative output pulses, leaving the ferroelectric crystal 30 in condition B; otherwise, the operation is the same as in Figs. 2A and 3, suitable changes being made in the connections of the diodes 14. To isolate the input pulses from each other, they are decoupled by diodes 34, germanium or copper oxide elements as in Fig. 2A.

The positive (or zero) storage pulses are applied, not necessarily simultaneously, to inputs *a, b, c, d*. In Fig. 8, negative pulses from a source symbolized by battery 17, are capable of reading out simultaneously the stored digits "1" or "0" to produce negative output pulses at output terminals *a'*—*d'*; for the number "1011," these outputs represent "1" at *a'*, *c'* and *d'*, "0" at *b'*. These output pulses are similar except in polarity to those illustrated in Fig. 3, line 4.

In the circuit of Fig. 8, the impedance presented by diodes 14 is low enough to permit complete reverse charging of crystal 30, so that as in Fig. 2A the memories stored in the individual cells are wholly erased. It may of course be arranged, by obvious modification of the application of the read-out pulses, that the stored digits shall appear in any desired sequence, instead of simultaneously. Moreover, by reversing the polarities of the storage and read-out pulses with reversed connections of diodes 14 and 34, the output pulses are made positive.

It may be preferred to use individual, separate memory cells instead of a plurality of such cells formed on a single crystal. Alternative embodiments of memory cells are shown in Figs. 9A, 9C and 9E.

Figure 9A:
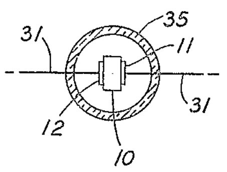

In Fig. 9A, ferroelectric crystal 10, with fired-on silver plates 11 and 12 and suitable lead wires 31, is housed in a protective plastic or other suitable shell 35. Leads 31 pass out through shell 35, which may be filled with any suitable atmosphere.

Figure 9B:
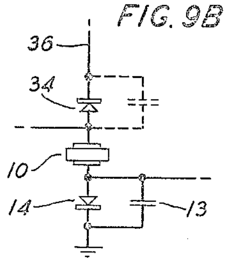
Figure 9C:
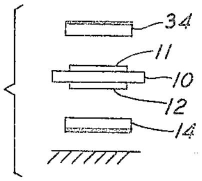

Fig. 9C shows an exploded view of a construction especially suited for use in the circuit of Fig. 8; Fig. 9B, a schematic. Here the rectifiers 14 and 34 of Fig. 8 are combined with crystal 10 and its leads, as in Fig. 1, in a compact assembly. Crystal 10, suitably in disc form, with silver plates 11 and 12 and associated leads, is placed between disc rectifiers 14 and 34, the back plate of rectifier 14 being grounded; the assembly is pressed together by spring means not shown. Rectifier 34 is provided with lead 36 for connection to the read-out pulse generator. Plates 11 and 12 are provided with leads to receive and deliver, respectively, input and output pulses at terminals *a* and *a'* of Fig. 8. The rectifiers 14 and 34 may be poled as in the schematic or reversely.

Figure 9D:
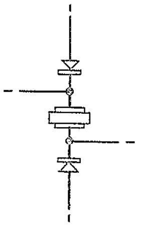
Figure 9E:
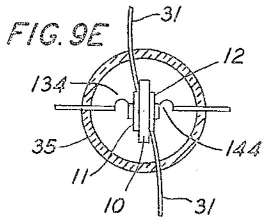

In Fig. 9E, shell 35 encloses crystal 10 with plates 11, 12 and leads 31, together with germanium diodes 134, 144, soldered to plates 11 and 12, respectively. At the left, in Fig. 9D, is shown the schematic of the assembly within shell 35; obviously, when a condenser is shunted across one of the diodes, this constitutes an element useful in the circuit of Fig. 8.

The arrangement shown in Fig. 8 is a parallel input-parallel output storage circuit in which storage pulses are individually followed by output pulses, at individual terminals for storage and for output. It is equally possible to store successive digits serially at a single input and read them out serially at a single output. A circuit for this purpose is shown in Fig. 10.

Referring now to Fig. 10, there is shown a circuit capable of storing the binary number 11. Input terminal 40 is connected through resistor 42 to crystal 101 of which the output circuit includes condenser 13 shunted by diode 14 as in Fig. 2A; the circuit including crystal 101 is designated "stage $A_1$." The junction of crystal 101 and condenser 13 is connected through resistor 43 to crystal 102, with its output circuit as in Fig. 2A; this constitutes stage $B_1$. Similarly, stages $A_2$ and $B_2$, respectively duplicating stages $A_1$ and $B_1$ and including crystals 103, 104, are connected, $A_2$ to $B_1$ via resistor 44 and $B_2$ to $A_2$ via resistor 45.

At terminal 50, positive "shift" pulses are applied through diodes 51 to crystals 101 and 103, while negative shift pulses at terminal 60 are applied through diodes 52 to crystals 102, 104.

To store the number 11, two negative storage pulses separated by a selected time interval are applied to input terminal 40, shunted to ground by diode 41 connected to present a high resistance to a negative pulse. Simultaneously with these input storage pulses, there are applied negative shift pulses at terminal 60, while succeeding each storage pulse is applied a positive shift pulse at terminal 50. Each type of shift pulse is a read-out pulse for the crystal to which it is applied, and serves to elicit from that crystal a pulse, of the same polarity as the shift pulse, which becomes a storage pulse for the succeeding crystal.

A first negative input pulse, storing "1," is applied at terminal 40 to crystal 101 through resistor 42. A negative shift pulse at terminal 60 is applied at the same time through diodes 52 to crystals 102 and 104, placing them in the state of polarization (B, Fig. 2B) appropriate to their later function.

Subsequent to the pulses just mentioned but before the arrival of the second negative input pulse, a positive shift pulse is applied at terminal 50 through diodes 51 to crystals 101 and 103. This pulse is a read-out pulse for stage $A_1$, destroying the memory in crystal 101 and therewith producing a positive pulse which is a storage pulse for crystal 102; the polarization of the latter changes then from B to A, Fig. 2B. The digit first negatively stored in stage $A_1$ is now positively stored in stage $B_1$. leaving vacant stage $A_1$.

The second negative input pulse now arrives simultaneously with a second negative shift pulse on crystals 102 and 104. It will be seen without detailed explanation that the second digit is now stored in stage $A_1$ while the first digit is shifted from stage $B_1$ to stage $A_2$ as a negative pulse.

A second positive shift pulse at terminal 50 is now applied to crystals 101 and 103, transferring the first digit from stage $A_2$ to stage $B_2$. The binary number is now stored with its first digit on crystal 104 in stage $B_2$, its second digit on crystal 102 in stage $B_1$, in each case in condition A, Fig. 2B.

A third negative shift pulse at crystals 102, 104 moves the first digit "1" to output terminal 70 as a negative output pulse, and simultaneously transfers the second digit "1" to crystal 103 in stage $A_2$.

A third positive shift pulse at crystals 101. 103 finds no work to do on crystal 101 but transfers the second digit from crystal 103 to crystal 104 in stage $B_2$; from there a fourth negative pulse at terminal 60 reads out the second "1" as a negative pulse at terminal 70.

It will be understood that the positive and negative shift pulses occur at the same frequency as do the storage pulses, the negative shift pulses being in time coincidence with the storage pulses while the positive shift pulses are each half way between, in time, the preceding and the succeeding negative shift pulse. Initially, of course, conditions A and B (Fig. 2B) prevail at crystals 101, 103 and 102, 104, respectively.

Means for generating the sequences of shift pulses in proper phase relation, and for introducing storage pulses at 40 in coincidence with the negative pulses at 60, are not shown but will be readily provided by those acquainted with data storage and computer circuits. It will be clear that the circuit of Fig. 10 may readily be modified for serial input and parallel output or inversely.

When negative shift pulses are applied at terminal 60, their passage back from stages $B_1$, $B_2$ to $A_1$, $A_2$ is prevented by making the resistances of resistors 42, 43, 44 and 45 large compared to the forward resistances of diodes 14. Diodes 51 and 52 are used to prevent coupling between the crystals 101, 103 and 102, 104; their back resistances are large compared to the back resistances of diodes 14. The shift pulses, of both polarities, may come from relay contacts for low frequency operation, or from vacuum tubes for operation at high frequencies.

The input and output pulses in Fig. 10 are negative; obviously by reversing all diodes and pulse polarities, positive outputs may be obtained from positive inputs. It will be seen that one A-stage and one B-stage are required for each digit to be stored; therefore, any additional digits require building out the circuit of Fig. 10 in easily understood manner.

In Fig. 11, the negative input pulses at terminal 40 storing the digits "1" are represented on line 1. Lines 2 and 3 show respectively the positive shift pulses at terminal 50 and the negative shift pulses at terminal 60. The output pulses from stages $A_1$, $B_1$, $A_2$ and $B_2$ (the final output) are represented on lines 4, 5, 6 and 7, respectively. The input and shift pulses at terminals 40 and 60 and the output pulses are of the same polarity, and the first stored pulse is the first to be read out. In this circuit, due to the shift in polarity in transfer of a storage pulse from an "A" to a "B" stage, the storage and final output pulses are of the same polarity; the "B" shift pulses are those which correspond to the read-out pulses of previously described circuits, since it is always a "B" pulse (line 3 of Fig. 11) which coincides in time with a final output pulse (line 7 of Fig. 11).

The smaller positive and negative pulses shown in lines 4, 5 and 6, correspond to the application of a positive or negative shift pulse to a ferroelectric crystal already in the state of polarization of that polarity; this has been explained in connection with Fig. 2B. It is also seen from Fig. 11 that the first digit is read out by the third, the second digit by the fourth, negative shift pulse.

Where the circuit of Fig. 10 requires a plurality of shift pulses, and two stages for each stored digit, this requirement is absent from the delay line storage circuit now to be described in connection with Fig. 12.

In Fig. 12 separate single crystals 10 are used, storing each a digit at one of inputs *a*, *b*, *c*, *d*, as in Fig. 8. Positive input pulses separately store, and negative pulses simultaneously read out, the digits; four storages are represented in the figure, but obviously provision may be made for storing any desired number of digits and by reversal of the diode connections the opposite pulse polarities may be used.

A single negative read-out pulse applied simultaneously to diodes 34 releases all the stored digits at once. Now the output circuits of the individual crystals 10 include sections, say three each, of delay line generally designated by the numeral 100. Line 100 is a known form of delay line; in it coils 101 are of 11 or 12 microhenrys' inductance, condensers 102 are of 75 micromicrofarads' capacitance, resistors 103 are each 430 ohms; while condensers 105 have each one half the capacitance of condensers 102 and condensers 106 are each of such capacitance as to be, with the external capacitance to ground of the tap between a crystal 10 and line 100 equal to the 75 micromicrofarads of condensers 102. If terminal 110 is taken as the output terminal, a diode 108 may be shunted across output resistor 103 to prevent input pulses from appearing on the output.

Input pulses *a*, *b*, *c* and *d* may be applied, in any order, and a single output pulse through diodes 34 reads out, simultaneously as concerns crystals 10 themselves, all the stored digits. These digits, as pulses read out, travel in each direction from the respective taps along the delay line, so that at terminal 110 they are perceived in the reverse order of their points of entrance to line 100: if *a*, *b*, *c*, and *d* are read out at the same instant, *d'* is the first pulse recognized at terminal 110. In the opposite direction of transmission, *a'* is the first to appear at the opposite end of line 100.

The time delay between consecutive taps and therefore between pulses at terminal 110, is one microsecond, enough to recognize one-half microsecond input pulses as distinct outputs. The resistance of resistors 103 is the characteristic impedance of line 100.

Fig. 13 is a diagram of a counting and registering circuit which shows in detail the first, second, ninth and tenth of ten stages each including a ferroelectric memory element 10 as in Fig. 2A. In all odd-numbered stages such as 1 and 9, the initial state of ferroelectric polarization is negative, while in even-numbered stages such as 2 and 10, this state is positive (conditions B and A, respectively, Fig. 1). This is accomplished by momentarily operating relays $R_1$ through $R_{10}$ to apply an initial polarizing pulse, positive from battery 150 to the even stages, negative from battery 151 to the odd stages. Relays $R_1$ through $R_{10}$ are then released and crystals 10 are prepared to respond to successive (alternatively positive and negative) pulses to be counted, applied by operating first relay 152, then relay 153, to apply the ten pulses alternately from batteries 154 and 155 to the crystal of stage 1. Relays $A_1$ through $A_{10}$ are initially released, as shown.

Stage 1 being initially polarized negatively, the first positive pulse from battery 154 produces a positive pulse from stage 1 which passes to the crystal of stage 2, leaving the crystal of stage 1 positively polarized. In stage 2 the polarization, initially positive, is not affected by the positive pulse read out from stage 1. The positive pulse from battery 154 which is the first pulse to be counted, has left the crystals in stages 1 and 2 both in condition A, Fig. 1, and no pulse passes beyond stage 2 until a negative pulse, the second of the pulses to be counted, is applied from battery 155 by operating relay 153.

This negative pulse finds positive polarization in stage 1, leaves that stage negatively polarized and produces a negative pulse to reverse the polarization of stage 2 and provide from stage 2 negative pulse to stage 3; the last is already negatively polarized and thus is unaffected by the negative pulse from stage 2.

The second pulse applied has thus left stages 1 and 2 both negatively polarized, and a negative pulse from stage 2 applied to stage 3 has made no change in the latter. Continuing the application of pulses to be counted, odd numbered pulses positive, even numbered pulses negative, there result progressive changes in the states of polarization of the ferroelectric crystals in the group.

The successive input pulses leave the states of polarization of the crystals, originally negative for stages 1, 3, 5, 7 and 9 and positive for stages 2, 4, 6, 8 and 10, as follows:

Pulse 1+, stages 1, 2 positive;
Pulse 2—, stages 1, 2, 3 negative;
Pulse 3+, stages 1, 2, 3, 4 positive; etc.

In short, the *n*th pulse leaves the first *n* stages in the same polarity as the pulse, the later stages being in their initial polarity. When ten stages are used, as shown by way of example in Fig. 13, and ten pulses are applied of which even and odd pulses are positive and negative, respectively, all the ferroelectric elements are negatively polarized.

To read out the pulses stored in the crystals of Fig. 13, relays $A_1$ through $A_{10}$ are closed, thereby disconnecting the stages from each other and connecting the crystals individually to output terminals $O_1$ to $O_{10}$. Relays R are then momentarily operated, restoring the crystals to their respective initial polarizations; on this closure, from the crystals which were left by the last applied pulse in a polarization opposite to their initial state, pulses are supplied to their respective output terminals, and these output pulses are each of the initial polarity of the crystal from which it is derived.

As an example, consider the counting and reading out to a registering mechanism (not shown in Fig. 13) of four pulses. The fourth pulse left the first four stages negatively polarized, the remaining six unchanged from their initial states. Of the first four, stages 2 and 4 are polarized oppositely to their initial state and a positive pulse from battery 150 produces from each of them a positive output pulse, at terminals $O_2$ and $O_4$. No pulse appears at any of the other terminals. As another example, after the tenth pulse all ten stages are negatively polarized, that is stages 2, 4, 6, 8, 10 are in a state opposite the initial state, and positive pulses appear at each of the corresponding output terminals. In general, it may be stated that the highest numbered output terminal at which a pulse is read out has the number of pulses counted, and that the polarity of the output pulses is positive for an even, negative for an odd, number of input pulses. In addition to a pulse at the highest numbered output terminal, like pulses appear at each second lower numbered terminal.

The source of pulses to be counted and the registering apparatus utilizing the output pulses are not parts of the present invention and therefore are not shown. It is clear that the few stages illustratively described may be expanded to a desired larger number, even or odd.

Relay systems R and A, shown as separate relays, may of course each be a single relay with a suitable pile-up of contacts. All polarities may be reversed.

Inasmuch as the stored pulses are read out by momentarily applying the same voltages, batteries 150, 151, as initially prepared the circuit, it is obvious that after reading out the circuit is ready to count anew as soon as relays R and A are released.

Fig. 14 shows a circuit modified from that of Fig. 10 and permitting a negative storage pulse at input terminal 160 to be read out repeatedly with no loss in amplitude. Crystals 10*a* and 10*b* are each connected to ground as in Fig. 2A, diodes 14 being oppositely poled in the two cases. Electrode 12 of crystal 10*a* is connected to electrode 11 of crystal 10*b* through resistor 25. Voltage sources 26 and 27 permit the application of polarizing and shifting pulses, positive to crystal 10*a*, negative to crystal 10*b*. Diodes 24 are oppositely poled to offer low impedance to a negative pulse at terminal 160 and to a positive pulse via resistor 25, as diodes 14 are poled to offer low impedance to ground to negative and positive pulses, respectively, applied to crystals 10*a* and 10*b*. When switch S is closed, as shown, output terminal 165 and electrode 12 of crystal 10*b* are connected through resistor 28 to input terminal 160.

To store a negative pulse (digit "1"), switch S is opened and the ferroelectric crystals are prepared for operation by momentarily applying sources 26 and 27 to polarize crystals 10*a* and 10*b* positively and negatively, respectively. Whatever output pulses may be produced in this application are of no effect at terminal 165, switch S being open.

A negative pulse now applied to crystal 10*a* reads out a negative pulse which is transferred via resistor 25 to crystal 10*b;* this crystal is already negatively polarized and the pulse read out from crystal 10*a* is of no effect. The digit is now stored in crystal 10*a*, negatively polarized.

In sequence thereafter, switch S is closed and shift pulses are applied, first from source 26, then from source 27. The first shift pulse reads out a positive pulse from crystal 10*a*, leaving that crystal positively polarized as had previously been arranged. This read-out pulse, through resistor 25, polarizes positively crystal 10*b*. The second shift pulse to crystal 10*b* reads out therefrom a negative pulse which appears at terminal 165, leaving negatively polarized crystal 10*b*. Simultaneously, the negative pulse so read out is fed back to terminal 160; crystal 10*a* having been left positively polarized, this condition is reversed by the pulse fed back. The condition of the circuit is now precisely what it was when the digit was first stored in crystal 10*a*. Obviously, it may be read out again by repeating the above-described sequence.

Digit "1" is thus permanently stored, first in crystal 10*a*, then in crystal 10*b* when source 26 alone is applied. The stored digit pulse is negative when in the former, positive when in the latter, crystal. It may be left in the former by applying neither of sources 26, 27 or in the latter by applying only source 26. Switch S remains closed except for the first storage operation. Any number of successively read-out pulses may be derived from the pulse stored in crystal 10*a* by mechanism (not shown) repeating at any desired rate the application in sequence of sources 26, 27.

By reversal of all polarities, positive digit "1" pulses may be dealt with by the circuit of Fig. 14. Digit "0" is represented by no pulse at terminal 160, as in other circuits previously described.

What is claimed is:

1. A memory circuit comprising a condenser having a dielectric of a ferroelectric material, said material having a hysteresis loop with a high ratio between the slopes of the side portions of the loop and the slopes of the top and bottom portions of the loop, means applying a pulse to said condenser to polarize said material to one point along said hysteresis loop, means applying storage pulses to said condenser, said storage pulses of one polarity reversing the polarization of said material to another point on said hysteresis loop, means applying a read out pulse to said condenser of a predetermined polarity and of a magnitude sufficient to cause said material to traverse a portion of said loop, and means receiving an output pulse from said condenser on application thereto of said read out pulse, the magnitude of said output pulse depending on the slope of the portion of said hysteresis loop traversed by said material on application of said read out pulse whereby the number is stored in said condenser by polarizing said material to one of said points along said loop.

2. A memory circuit comprising a condenser having a dielectric of a ferroelectric material in an initial polarization, said material having a hysteresis loop with a high ratio between the slopes of the side portions of the loop and the slopes of the top and bottom portions of the loop, means applying storage pulses to said condenser, said storage pulses of one polarity reversing the polarity of polarization of said material, a capacitor in series with said condenser, and means applying a read out pulse across said condenser and capacitor to cause said material to traverse a portion of said loop, the magnitude of the voltage appearing at the connection between said condenser and said capacitor depending on the slope of the portion of said loop traversed by said material on application of said read out pulse.

3. A memory circuit in accordance with claim 2, including a diode connected in parallel with said capacitor and poled to present a high impedance to pulses tending to polarize said material to its initial state of polarization.

4. A memory circuit in accordance with claim 2, wherein said ferromagnetic material is barium titanate.

5. A memory circuit comprising a condenser having a dielectric of a ferroelectric material, said material having a hysteresis loop with a high ratio between the slopes of the side portions of said loop and the slopes of the top and bottom portions of said loop, and said material having an initial polarization at one point on said hysteresis loop, means applying a pulse to said material of opposite polarity to said polarization to cause said material to traverse said loop to a second point on said loop of opposite polarization than said first point, a capacitor in series with said condenser, a rectifier element connected across said capacitor, an output terminal connected to the junction of said capacitor and said condenser, and means applying a read out pulse to said condenser, said read out pulse being of a polarity to restore the initial polarization of said material, whereby said material traverses at least a portion of the remainder of said loop.

6. A data storage circuit including a plurality of condensers each having a dielectric of a ferroelectric material, said material having a hysteresis loop with a high ratio between the slopes of the side portions of the loop and the slopes of the top and bottom portions of the loop, means applying a pulse to each of said condensers to polarize said material initially to one point along said hysteresis loop, a capacitor shunted by a rectifier in series with each of said condensers, said rectifiers being poled to present a high impedance to said pulse polarizing said material initially to one point along its hysteresis loop, means applying storage pulses to each of said condensers, said storage pulses of one polarity reversing the polarity of polarization of said material, and means applying a read-out pulse to each of said condensers of a predetermined polarity and of a magnitude sufficient to cause said material to traverse a portion of said loop, the magnitude of the voltage appearing at the connection of each of said condensers and said capacitors depending on the slope of the portion of said loop traversed by said material on application of said read-out pulse.

7. Means for serially storing and serially reading out a sequence of voltage pulses, each representative of a unit digit comprising a plurality of condensers each having a dielectric of a ferroelectric material, said material having a hysteresis loop with a high ratio between the slopes of the side portions of the loop and the slopes of the top and bottom portion of the loop, the number of said condensers being double the number of digits to be stored, means applying pulses to said condensers initially to polarize them alternately to opposite points on their hysteresis loops, means resistively connecting said condensers in series with an input terminal, each of said condensers being grounded through a capacitor shunted by a rectifier poled to present a high impedance to said pulses initially polarizing said material, means for sequentially applying to the input terminal a series of storage pulses representing the digits to be stored and of a polarity to reverse the polarization of the first of said condensers to another point on the hysteresis loop of the dielectric thereof, a first and a second shift terminal connected respectively to alternate ones of said condensers through individual rectifiers, means for applying to said second shift terminal a series of voltage pulses of the same polarity as and simultaneous with said storage pulses, means for applying to the first shift terminal a series of voltage pulses opposite in polarity to and intercalated between successive storage pulses and an output terminal at the junction of the last condenser and the capacitor in series therewith.

8. A storage circuit including a multisection delay line including capacitors, a plurality of condensers each having a dielectric of a ferroelectric material connected individually in series with a capacitor of adjacent sections of said line, said material having a hysteresis loop with a high ratio between the slopes of the side portions of the loop and the slopes of the top and bottom portions of the loop, means applying a pulse to each of said condensers to polarize said material initially to one point on said hysteresis loop, an output circuit including a resistor shunting the final section of the line, means for applying in a desired sequence to the several condensers voltage pulses of a polarity adapted to reverse the polarity of polarization of said material, and means for subsequently applying simultaneously to said condensers a voltage pulse of a magnitude and polarity to restore the polarization of the material to the initial point on said hysteresis loop.

9. A circuit for counting plurality of data represented by voltage pulses of consecutively alternate polarity comprising a plurality of condensers in number at least equal to the data to be counted, each of said condensers having a dielectric of a ferroelectric material having a hysteresis loop with a high ratio between the slopes of the side portions and the slopes of the top and bottom portions, means connecting said condensers in series, a capacitor in series with each of said condensers, a resistor shunting each of said capacitors, means applying a voltage pulse to a first group of alternate condensers to polarize said ferroelectric material of said condensers initially to one point on said hysteresis loop, means applying a voltage pulse to the remaining alternate condensers to polarize said ferroelectric material of said condensers initially to the opposite point on said loop, means for applying in succession to the first of said condensers the data-representing pulses alternately of such polarity to reverse and restore the initial polarization of the dielectric of said first condenser, output terminals connectable to the junctions of said condensers and said capacitors, means for simultaneously disconnecting the condensers from each other and connecting said junctions individually to said output terminals, and means for restoring the initial polarizations of said dielectrics.

10. A permanent memory storage circuit comprising a pair of condensers each having a dielectric of a ferroelectric material, said material having a hysteresis loop with a high ratio between the slopes of the side portions of the loop and the slopes of the top and bottom portions of the loop, an input and an output circuit for each of said condensers, a resistive connection between the output circuit of the one and the input circuit of the other condensers, means for initially applying pulses to said condensers to polarize the dielectrics thereof in opposite directions, means for applying to the input circuit of the one condenser a storage pulse of a polarity and magnitude to reverse the polarization of the one condenser dielectric, switching means for effecting a resistive connection between the output circuit of the other and the input circuit of the one condenser, and means applying a read-out shift pulse to said one condenser of a predetermined polarity and of a magnitude sufficient to restore the initial polarization of said one condenser dielectric.

11. A memory circuit comprising a condenser having a dielectric of a ferroelectric material in an initial polarization, said material having a hysteresis loop with a high ratio between the slopes of the side portions of the loop and the slopes of the top and bottom portions of the loop, means applying a storage pulse to said condenser of a polarity to reverse the polarity of polarization of said material, an impedance in series with said condenser, and means applying a read-out pulse to said condenser to cause said material to traverse a portion of said loop, the magnitude of the voltage appearing at the connection between said condenser and said impedance depending on the slope of the portion of said loop traversed by said material on application of said read-out pulse.

12. A memory circuit comprising a condenser having a dielectric of a ferroelectric material, said material having a hysteresis loop with a high ratio between the slopes of the side portions of the loop and the slopes of the top and bottom portions of the loop, means applying a pulse to said condenser to polarize said material to one point along said loop, means applying storage pulses to said condenser, said storage pulses of one polarity reversing the polarization of said material to another point on said loop, an impedance in series with said condenser, and means applying a read-out pulse to said condenser of a predetermined polarity and of a magnitude sufficient to cause said material to traverse a portion of said loop, the magnitude of the output pulse appearing at the connection between said condenser and said impedance on application of said read-out pulse to said condenser depending on the slope of the portion of said hysteresis loop traversed by said material on application of said read-out pulse.

13. A memory circuit comprising a condenser having a dielectric of a ferroelectric material, said material having a hysteresis loop with a high ratio between the slopes of the side portions of said loop and the slopes of the top and bottom portions of said loop, and said material having an initial polarization at one point on said hysteresis loop, means applying a pulse to said material of opposite polarity to said polarization to cause said material to traverse said loop to a second point on said loop of opposite polarization than said first point, an impedance in series with said condenser, an output terminal connected to the junction of said condenser and said impedance, and means applying a read-out pulse to said condenser, said read-out pulse being of a polarity to restore the initial polarization of said material whereby said material traverses at least a portion of the remainder of said loop.

UNITED STATES PATENTS

References Cited in the file of this patent

| | | |
|---|---|---|
| 2,306,555 | Mueller | Dec. 29, 1942 |
| 2,430,457 | Dimond | Nov. 11, 1947 |
| 2,473,556 | Wiley | June 21, 1949 |
| 2,486,560 | Gray | Nov. 1, 1949 |
| 2,519,513 | Thompson | Aug. 22, 1950 |
| 2,521,329 | Begun | Sept. 5, 1950 |
| 2,526,207 | Donley | Oct. 17, 1950 |
| 2,540,194 | Ellett | Feb. 6, 1951 |
| 2,614,167 | Kamm | Oct. 14, 1952 |

OTHER REFERENCES

"Static Magnetic Storage and Delay Line" by An Wang and W. D. Woo; Journal of Applied Physics; volume 21, January 1950; pp. 49–54.

"Magnetic Delay Line Storage" by An Wang; Proceedings of the I. R. E.; April 1951; pp. 401–407.